United States Patent
Steffens et al.

(10) Patent No.: US 11,313,442 B2
(45) Date of Patent: Apr. 26, 2022

(54) RANGE-CHANGE TRANSMISSION DEVICE

(71) Applicant: DAIMLER AG, Stuttgart (DE)

(72) Inventors: Frank Steffens, Ostfildern (DE); Detlef Schnitzer, Denkendorf (DE); Ingo Pfannkuchen, Friedrichshafen (DE); Jens Luckmann, Winnenden (DE)

(73) Assignee: DAIMLER AG, Stuttgart (DE)

( * ) Notice: Subject to any disclaimer, the term of this patent is extended or adjusted under 35 U.S.C. 154(b) by 255 days.

(21) Appl. No.: 16/639,448

(22) PCT Filed: Jun. 25, 2018

(86) PCT No.: PCT/EP2018/066874
§ 371 (c)(1),
(2) Date: Feb. 14, 2020

(87) PCT Pub. No.: WO2019/034309
PCT Pub. Date: Feb. 21, 2019

(65) Prior Publication Data
US 2021/0148438 A1    May 20, 2021

(30) Foreign Application Priority Data
Aug. 16, 2017    (DE) .................... 10 2017 007 762.2

(51) Int. Cl.
*F16H 3/78* (2006.01)
*F16H 3/12* (2006.01)
(Continued)

(52) U.S. Cl.
CPC ............. *F16H 3/126* (2013.01); *F16H 3/666* (2013.01); *F16H 3/78* (2013.01); *F16H 37/042* (2013.01);
(Continued)

(58) Field of Classification Search
CPC .......... F16H 3/126; F16H 3/78; F16H 37/042; F16H 2200/0043
See application file for complete search history.

(56) References Cited

U.S. PATENT DOCUMENTS

| 4,200,006 A | 4/1980 | Ehrlinger et al. |
| 6,634,986 B2 * | 10/2003 | Kima ...................... F16H 3/725 477/107 |

(Continued)

FOREIGN PATENT DOCUMENTS

| DE | 2715874 A1 | 10/1978 |
| DE | 2718652 A1 | 11/1978 |

(Continued)

OTHER PUBLICATIONS

International Search Report dated Oct. 17, 2018 in related/corresponding International Application No. PCT/EP2018/066874.

(Continued)

*Primary Examiner* — Huan Le
(74) *Attorney, Agent, or Firm* — Patent Portfolio Builders PLLC

(57) ABSTRACT

A range-change transmission device, which is a splitter transmission, includes an input shaft, an output shaft, a countershaft, at least one planetary gear set, and a torque adjustment device. A first transmission element of the planetary gear set is arranged coaxially to the output shaft. A second transmission element of the planetary gear set is or can be directly coupled to the countershaft. A third transmission element of the planetary gear set is permanently coupled to the input shaft in a rotationally fixed manner. The countershaft is or can be coupled to the torque adjustment device. The range-change transmission device has a first switching unit, which is provided to couple the countershaft to the output shaft.

12 Claims, 5 Drawing Sheets

Figure 1:
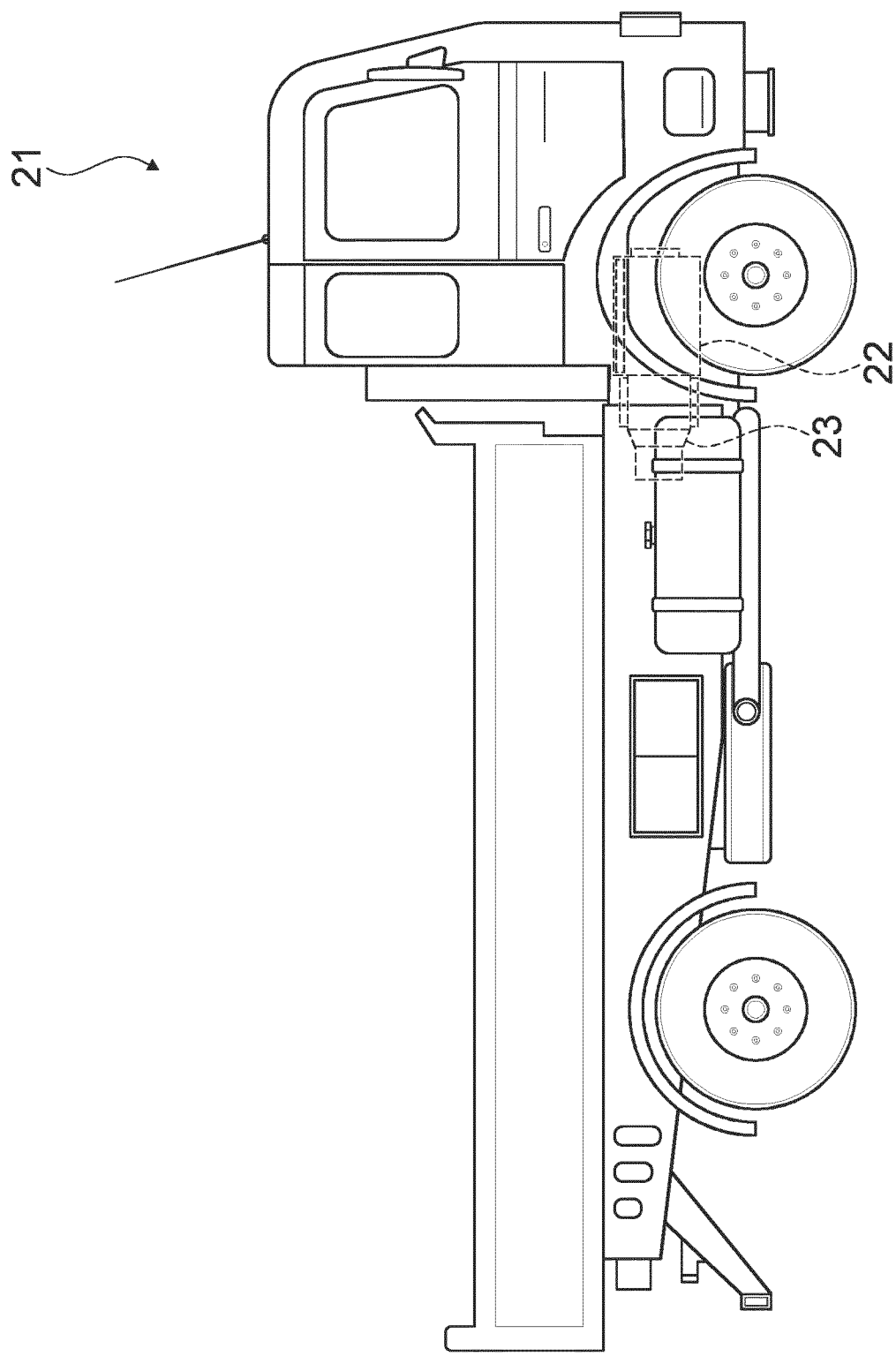

(51) Int. Cl.
    *F16H 3/66*     (2006.01)
    *F16H 37/04*     (2006.01)

(52) U.S. Cl.
    CPC .................. *F16H 2037/045* (2013.01); *F16H 2200/0043* (2013.01)

(56) References Cited

U.S. PATENT DOCUMENTS

| | | | |
|---|---|---|---|
| 7,914,412 B2 * | 3/2011 | Gitt | F16H 37/046 475/207 |
| 2003/0100395 A1 | 5/2003 | Hiraiwa | |
| 2007/0259748 A1 * | 11/2007 | Forsyth | F16H 3/725 475/5 |
| 2014/0100072 A1 * | 4/2014 | Kaltenbach | F16H 3/62 475/151 |

FOREIGN PATENT DOCUMENTS

| | | |
|---|---|---|
| DE | 10322234 A1 | 12/2004 |
| DE | 102009025094 A1 | 12/2010 |
| DE | 102011002472 A1 | 7/2012 |
| GB | 1596830 A | 9/1981 |
| WO | 2015063050 A1 | 5/2015 |

OTHER PUBLICATIONS

Office Action created on Jan. 22, 2018 in related/corresponding DE Application No. 10 2017 007 762.2.
Written Opinion dated Oct. 17, 2018 in related/corresponding International Application No. PCT/EP2018/066874.

* cited by examiner

|  | S2 | | | S1 | | |
| --- | --- | --- | --- | --- | --- | --- |
| Gang | S21 | S2N | S22 | S11 | S1N | S12 |
| G1 |  | X |  | X |  |  |
| G2 |  | X |  |  |  | X |
| G3 | X |  |  |  | X |  |
| G4 |  |  | X |  | X |  |

Fig. 5

RANGE-CHANGE TRANSMISSION DEVICE

BACKGROUND AND SUMMARY OF THE INVENTION

The invention relates to a range-change transmission device, in particular a power-shiftable power split device, particularly preferably a power shift claw transmission.

Transmission devices having two transmission branches, which are operated alternatingly, are known from DE 10 2009 025 094 A1 and DE 103 22 234 A1.

A range-change transmission device having an input shaft, an output shaft, a countershaft, at least one planetary gear set and a torque adjustment device, wherein a first transmission element of the planetary gear set is permanently coupled in a rotationally fixed manner with the output shaft, is already known from WO 2015/063050 A1, wherein a second transmission element of the planetary gear set is or can be directly coupled to the countershaft, wherein a third transmission element of the planetary gear set is permanently coupled in a rotationally fixed manner with the input shaft, and wherein the countershaft is or can be coupled to the torque adjustment device.

Moreover, range-change transmission devices are known from DE 10 2009 025 094 A1, DE 27 18 652 A1 and the generic DE 27 15 874 A1, in which a switching unit is additionally provided, by means of which the countershaft can be coupled to the output shaft at least in certain operating states Exemplary embodiments of the invention are directed to a range-change transmission device with improved properties with regard to efficiency, in particular energy efficiency.

According to the invention, a range-change transmission device includes an input shaft, an output shaft, a countershaft, at least one planetary gear set and a torque adjustment device, wherein a first transmission element of the planetary gear set is arranged coaxially to the output shaft and is or can be coupled to the output shaft in such a way that the first transmission element and the countershaft rotate with the same angular velocity, wherein a second transmission element of the planetary gear set is or can be directly coupled to the countershaft, wherein a third transmission element of the planetary gear set is arranged coaxially to the input shaft and permanently connected to the input shaft in such a way that the third transmission element and the input shaft always rotate with the same angular velocity, and wherein a first switching unit is provided to couple the countershaft to the output shaft.

It is proposed that the second transmission element of the planetary gear set is or can be coupled to the torque adjustment device, and a second switching unit is provided, which is attached to one of the transmission elements of the planetary gear set and which is provided to couple the input shaft to the countershaft. Preferably, the range-change transmission device is at least constructively provided for switching at least four forward gears. Due to the design of the range-change transmission device according to the invention, an advantageously high efficiency, in particular an energy efficiency, can be provided. Preferably, by means of the invention, it is possible to switch, in particular without interrupting the tractive force, by means of braking action, in particular by an e-machine. It is therefore possible to switch in a "recuperative" manner, in particular since a braking action by means of an electric machine signifies energy production. In particular, a recuperation of the switching energy can be achieved. Furthermore, no synchronization by means of an internal combustion engine is necessary. A reduction in switching times can be achieved. In addition, a dual clutch is not required and a free gear selection within the switching group is possible. Moreover, no multi-plate clutches or brakes are necessary. Wear-free starting and extremely slow maneuvering can be enabled. Furthermore, a load interruption-free gear change can thereby in particular be enabled.

In particular, it be avoided that, as when dual clutch transmissions are used, the switching energy in the dual clutch is converted into heat. By means of the range-change transmission device, in particular in the case of a design as a power split concept in a clawed design, it is in particular possible to cache the switching energy in connection with the torque adjustment device, in particular in the form of an electric machine and/or an energy storage system, for example, by means of a hydraulic system, and to feed it back to the drive after switching. The gear change without power flow interruption can thus be enabled, in particular only by means of torque reduction. This is possible, for example, by means of an electric machine, a retarder or a hydraulic pump.

A "range-change transmission device" should be understood in particular as at least one part of a range-change transmission. Alternatively, the range-change transmission device can completely form the range-change transmission. Advantageously, the range-change transmission device has a main range-change comprising a main shaft. The output shaft of the range-change transmission device is advantageously permanently connected to the main shaft of the main range-change in a rotationally fixed manner. The output shaft of the range-change transmission device is generally provided to generate a drive torque in the direction of a drive wheel of a motor vehicle.

The input shaft is provided for the direct or indirect connection of the range-change transmission device to a drive machine, preferably to a combustion engine.

The term "coupled" means that an element of the range-change transmission device, such as a shaft or a gear wheel, for example, is directly or indirectly connected to another element in a torque-transmitting manner. Such a "coupling" can be rotationally fixed, such that the one element and the other elements are arranged coaxially and firmly connected to each other, such that the one element and the other element always rotate with the same angular velocity.

More generally, however, a coupling can also be represented by a toothing engagement or multiple toothing engagements, or by a gear ratio.

The term "coupled" thus generally describes an arrangement, by means of which a torque can be transmitted.

The term "permanently coupled in a rotationally fixed manner" is limited to a permanent rotationally fixed arrangement between two elements.

The main group can, in particular, comprise a plurality of gears. The further arrangement of reduction gears, in particular of a range group, and/or a front-switching group is possible. Preferably, the range-change transmission device, in particular for HGVs, is provided in the form of a power split range-change transmission device for splitting a drive torque between a main shaft and a countershaft, wherein the countershaft is coupled again to the main shaft at one end. Preferably, one of the paths has switchable gear wheels, wherein the path with the switchable gear wheels has means for reducing or increasing the torque of this route. Preferably, at least one switchable gear wheel and/or its path can be freed of torque via the means, while the other route still transmits torque. In particular, this allows gear changes without torque interruption.

"Provided" is to be understood in particular to mean that an object is provided for a specific function and that the object fulfils and/or executes this specific function in at least one application and/or operating state. In this context, a "planetary gear set" is to be understood in particular as a unit of a planetary transmission having a gear element designed as a sun gear, having a gear element designed as an internal gear, having a gear element designed as a planet carrier and having several gear elements designed as planetary gears, wherein the transmission elements designed as planetary gears are arranged by the transmission element designed as a planetary wheel carrier on a circular path around the transmission element designed as a sun gear. A planetary transmission is to be understood in particular as a unit having at least one planetary gear set, preferably with exactly one planetary gear set. Alternatively, or additionally, the planetary transmission can be designed to be multi-stage and can preferably comprise several planetary gear sets.

Furthermore, a "torque adjustment device" should in particular be understood as a device provided in at least one operating state for changing a transmitted torque. Preferably, the torque adjustment device can be provided for a reduction and/or an increase in a transmitted torque. The torque adjustment device is preferably provided during a starting process and/or during a switching process for changing, in particular continuously changing, a transmission ratio of the range-change transmission device. Preferably, in at least one operating state, the torque adjustment device is provided to free at least one switchable gear wheel from a torque, to reduce and/or to increase a transmitted torque. The torque adjustment device is preferably formed by a braking element, in particular by an electric machine, a hydraulic pump, a retarder or a friction brake. In the form of an electric machine, the electric machine can be operated to act as a brake, in particular as a generator.

In this context, a "switching unit" is to be understood in particular as a unit with at least two coupling elements and at least one switching element that is provided to establish a switchable connection between the at least two coupling elements.

Preferably, the switching unit is formed as a double switching unit, namely by the switching unit being designed with three coupling elements. A "switching element" of a switching unit is to be understood in particular as an element that is preferably designed to be axially moveable and is provided in at least one operating state, in particular in at least one switching position, of the switching unit, for a coupling in a rotationally fixed manner of the at least two coupling elements. A "coupling element" is to be understood in particular as an element of the switching unit permanently connected in a rotationally fixed manner to a transmission element, such as a transmission shaft, an idler wheel, a fixed wheel and/or an axle, which is preferably axially and radially fixed and which is provided in particular for a frictional, force-locking and/or positive-locking connection to the switching element, such as an idler wheel which has a toothing for connection to the switching element. A "switching unit with three coupling elements" is to be understood in particular as a switching unit in which the switching element is provided to connect a coupling element, in particular an inner coupling element, to or decoupling it from at least one of the other two coupling elements in a switchable manner.

Furthermore, it is proposed that the second transmission element of the planetary gear set is permanently coupled in a rotationally fixed manner to an idler gear that is permanently engaged with a fixed gear of the countershaft. Preferably, the idler gear is formed by an idler gear of the input shaft. Preferably, the idler gear can be permanently connected to the second transmission element in a rotationally fixed manner via a hollow shaft mounted on the input shaft. An advantageous connection to the countershaft can thereby in particular be achieved. In particular, a direct coupling of the countershaft to the planetary gear set can be achieved.

Preferably, the second switching unit is formed by a switching unit with three coupling elements and is thus designed as a double switching unit.

Preferably, the second switching unit is provided in the first switching position to connect two transmission elements of the planetary gear set, in particular the second transmission element and the third transmission element, in a rotationally fixed manner. Preferably, the second switching unit in the first switching position is provided to connect a sun gear and a planetary gear carrier of the planetary gear set in a rotationally fixed manner. Particularly preferably, two coupling elements of the switching unit are each connected in a rotationally fixed manner to at least one transmission element of the planetary gear set. This is particularly advantageous for achieving an interlocking of the planetary gear set. In particular, a simple and efficient switching of the range-change transmission device can be achieved in this way.

It is also proposed that the first switching unit is located axially behind the planetary gear set. Preferably, the first switching unit is arranged behind the planetary gear set in the axial direction, viewed in the torque flow direction. Preferably, the first switching unit is arranged on a side of the planetary gear set facing away from the internal combustion engine. Particularly preferably, the first switching unit is arranged on the transmission output side, starting from the planetary gear set. In this way, an advantageous range-change transmission device can be provided. An advantageous arrangement can be achieved. In principle, however, it would also be conceivable that the planetary gear set is arranged on the output side and the countershaft and the output shaft are brought together via the planetary gear set.

It is further proposed that the second switching unit is arranged axially in front of the planetary gear set. Preferably, the second switching unit is arranged in front of the planetary gear set in the axial direction, viewed in the torque flow direction. Preferably, the second switching unit is arranged on a side of the planetary gear set facing the internal combustion engine. Particularly preferably, the second switching unit is arranged on the transmission input side, starting from the planetary gear set. In this way, an advantageous range-change transmission device can in particular be provided. An advantageous arrangement can be achieved.

It is also proposed that the first switching unit has a first switching position, a second switching position and a neutral switching position. Preferably, the first switching unit is functionless in a neutral switching position, i.e., it is not provided in particular for transmitting a drive torque. This allows in particular an advantageous range-change transmission device to be provided. An advantageously high efficiency can be achieved.

Furthermore, it is proposed that the first switching unit in the first switching position is provided to couple a first idler gear of the output shaft to the output shaft in a rotationally fixed manner. For this purpose, the first idler gear is preferably coupled in a rotationally fixed manner to a fixed gear, in particular a first fixed gear, of the output shaft via the first switching unit, in particular via the switching element of the first switching unit. Preferably, the first idler gear of the output shaft is permanently engaged with a fixed gear, in particular a first fixed gear, of the countershaft. In this way, an advantageous ability of the range-change transmission device to switch can in particular be achieved.

It is further proposed that the first switching unit in the second switching position is provided to couple a second idler gear of the output shaft to the output shaft in a rotationally fixed manner. For this purpose, the second idler gear of the output shaft is preferably coupled to a fixed gear in a rotationally fixed manner, in particular a second fixed gear, of the output shaft via the first switching unit, in particular via the switching element of the first switching unit. Preferably, the second idler gear of the output shaft is permanently engaged with a fixed gear, in particular a second fixed gear, of the countershaft. In this way, an advantageous ability of the range-change transmission device to switch can in particular be achieved.

It is further proposed that the range-change transmission device has a braking device provided to attach the second transmission element of the planetary gear set to the housing. It is further proposed that the second switching unit is provided in a first switching position for coupling to the braking device. In particular, the second switching unit is provided in a first switching position for coupling the second transmission element to the braking device. Preferably, the second switching unit is provided in a first switching position for connecting, by means of the switching element, the braking device fixed to the housing in a rotationally fixed manner to the idler gear of the input shaft, which is permanently coupled in a rotationally fixed manner to the second transmission element. The braking device can, for example, be formed by a toothing fixed to the housing. In principle, however, other designs of the braking device that appear sensible to a person skilled in the art are also conceivable. In this way, an advantageous ability of the range-change transmission device to switch can in particular be achieved.

It is further proposed that the second switching unit in a second switching position is provided to couple the input shaft to the countershaft. The second switching unit can be designed as a double switching unit for this purpose. However, the second switching unit can also consist of several parts, such that the parts can each couple two coupling elements independently of each other.

For coupling the input shaft to the countershaft by means of the second switching unit, the third transmission element is preferably interlocked with the second transmission element such that the second transmission element is coupled in a rotationally fixed manner to the input shaft. In this way, a particularly cost-effective switching unit for the range-change transmission device can be outlined.

Furthermore, it is proposed that the first transmission element of the planetary gear set is formed by a ring gear of the planetary gear set. It is further proposed that the second transmission element of the planetary gear set is formed by a sun gear of the planetary gear set. It is further proposed that the third transmission element of the planetary gear set is formed by a planet carrier of the planetary gear set. In principle, another design of the transmission elements, which would seem sensible to a person skilled in the art, would also be conceivable. In this way, an advantageous design of the range-change transmission unit can in particular be achieved.

Furthermore, the invention is also based in particular on a method of operating a range-change transmission device according to one of the preceding claims.

In the following, the terms "axial" and "radial" refer in particular to a main axis of rotation of the multi-stage transmission, so that the term "axial" refers in particular to a direction parallel to or coaxial with the main axis of rotation. Furthermore, the term "radial" refers in particular to a direction perpendicular to the main axis of rotation. The term "transmission input-side arrangement" should be understood to mean in particular that the component is located on one side of the input shaft facing the internal combustion engine. A "transmission output-side arrangement" means in particular that the said component is arranged on a side of the output shaft which faces away from the internal combustion engine.

BRIEF DESCRIPTION OF THE DRAWING FIGURES

Further advantages result from the following description of the figures. The figures depict an exemplary embodiment of the invention. The figures, description of the figures and the claims contain numerous features in combination. The person skilled in the art will expediently look at the features individually and combine them into meaningful further combinations.

Figure 2:
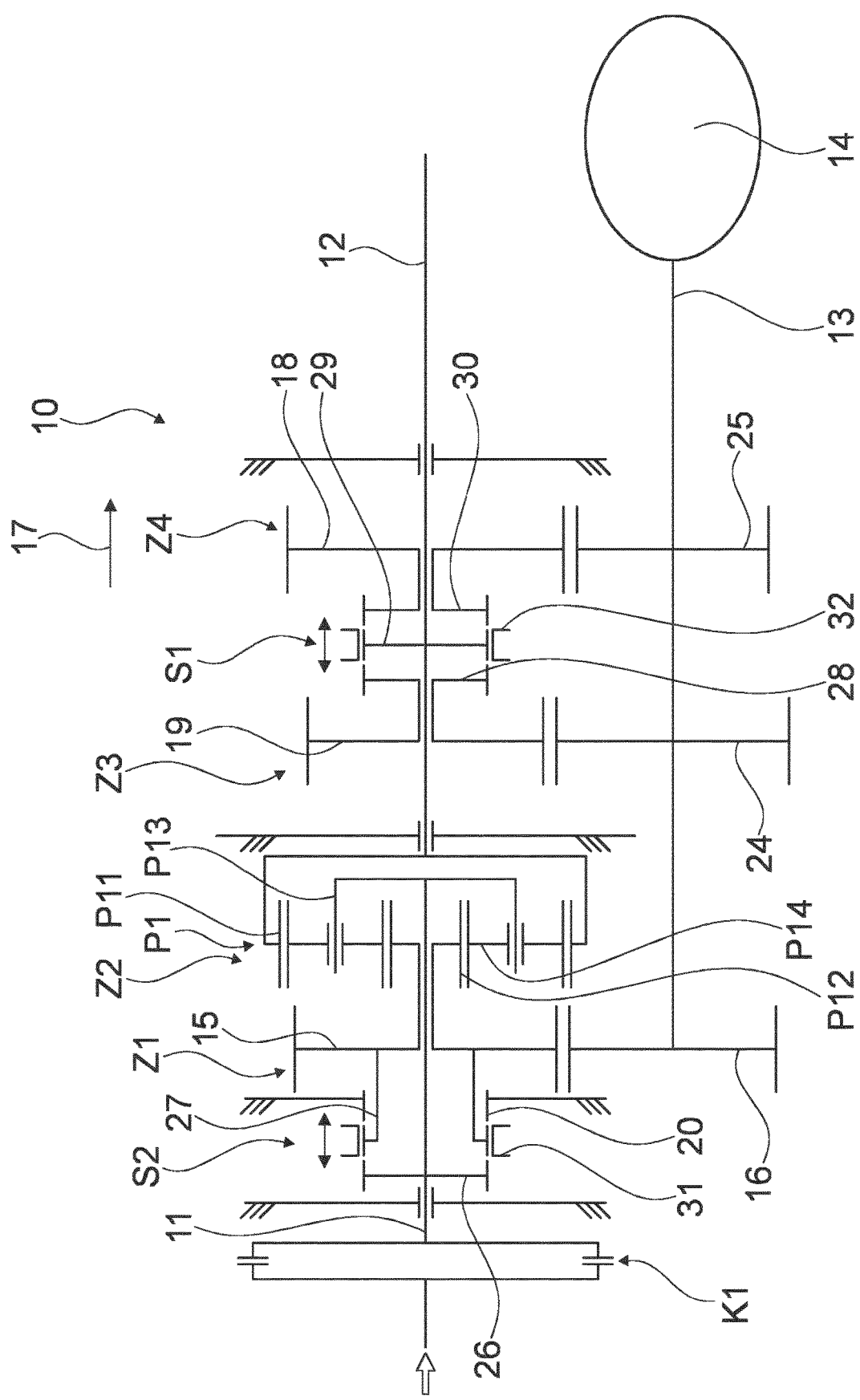
Figure 3:
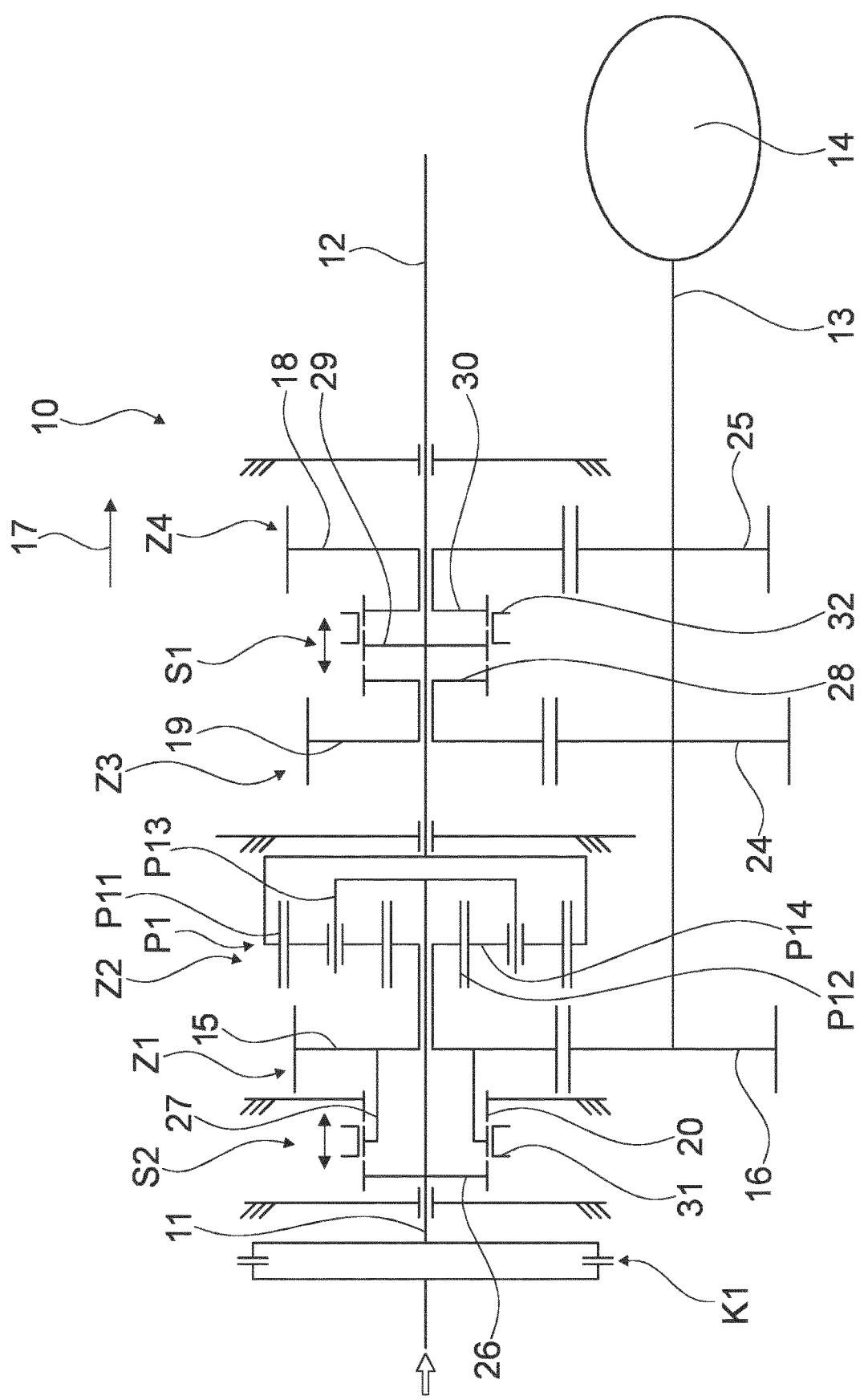
Figure 4:
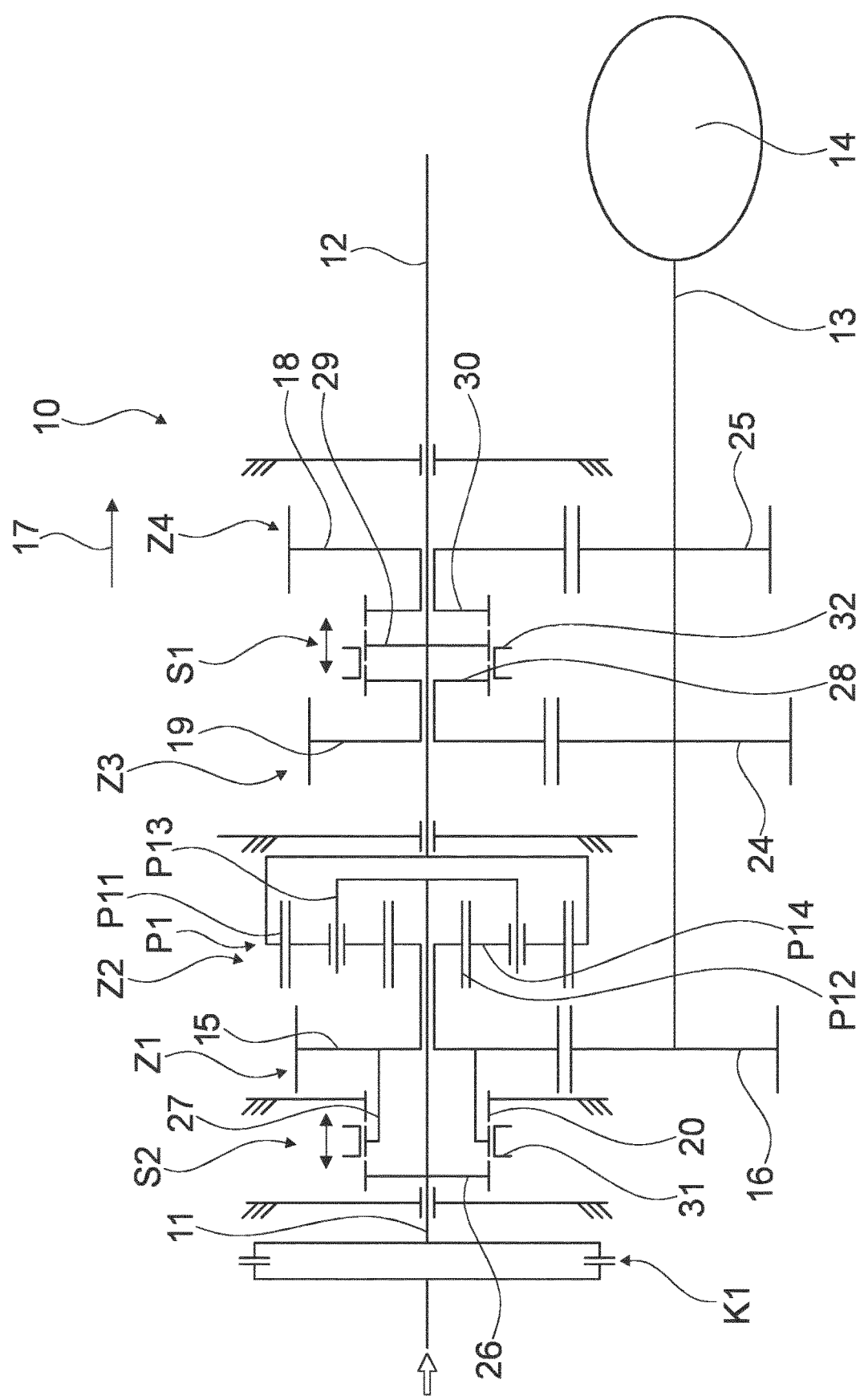

Here are shown:

FIG. 1 a motor vehicle having an internal combustion engine and having a range-change transmission device in a schematic depiction, FIG. 2 the range-change transmission device of the motor vehicle according to the invention in a schematic depiction in a neutral position, FIG. 3 the range-change transmission device of the motor vehicle according to the invention in a schematic depiction in a first gear, FIG. 4 the range-change transmission device of the motor vehicle according to the invention in a schematic depiction in a second gear and FIG. 5 a circuit diagram of the range-change transmission device according to the invention.

DETAILED DESCRIPTION

FIG. 1 schematically shows a motor vehicle 21. The motor vehicle 21 is formed by a commercial vehicle. The motor vehicle 21 is exemplarily formed by an HGV. In principle, however, a different design of a motor vehicle 32, which would seem to make sense to a person skilled in the art, would also be conceivable. The motor vehicle 21 comprises a drive train, via which the drive wheels of the motor vehicle 21 are driven in a way that is not visible. The drive train comprises a drive unit 22. The drive unit 22 is formed by an internal combustion engine. In addition, the motor vehicle 21 has a multi-stage transmission 23. The drive unit 22 has a driven crankshaft connected to the multi-stage transmission 23. The multi-stage transmission 23 is formed by a motor vehicle transmission and also forms part of the drive train of the motor vehicle 21. The multi-stage transmission 23 is arranged along the drive train, especially along a power flow of the drive train, behind the drive unit 22. The multi-stage transmission 23 has a range-change transmission device 10. The multi-stage transmission 23 is formed by a range-change transmission device 10. The range-change transmission device 10 is formed by a splitter transmission. The range-change transmission device 10 is constructively provided to switch four transmission gears G1, G2, G3, G4. In principle, the further arrangement of reduction gears, such as of a range group and/or a front-switching group, would also be possible.

The range-change transmission device 10 comprises an input shaft 11, which is provided for connection to a clutch K1. The input shaft 11 is provided on the input side for a connection to a clutch K1. Furthermore, the range-change transmission unit 10 comprises an output shaft 12, which is arranged coaxially to the input shaft 11 and is provided for connection to a planetary gear set P1.

The input shaft 11, the output shaft 12 and the planetary gear set P1 are arranged coaxially to each other.

The range-change transmission device 10 further comprises a countershaft 13, which is arranged parallel and offset to the input shaft 11, and is designed as a solid shaft. The range-change transmission device 10 comprises four gear wheel planes Z1-Z4, a first gear wheel plane Z1, a second gear wheel plane Z2, a third gear wheel plane Z3 and a fourth gear wheel plane Z4.

The range-change transmission device 10 comprises two switching units S1, S2, a first switching unit S1 and a second switching unit S2. The range-change transmission device 10 can be connected to the drive unit 22 via the clutch K1, in particular a power-switch clutch.

The range-change transmission device 10 has the planetary gear set P1, which is designed as a single planetary gear set. In principle, however, it would also be conceivable that the planetary gear set P1 is formed by a double planetary gear set, for example. The planetary gear set P1 is arranged in the second gear wheel plane Z2 and forms the second gear wheel plane Z2. The planetary gear set P1 comprises three gear elements P11, P12, P13. The planetary gear set P1 comprises a first transmission element P11, a second transmission element P12 and a third transmission element P13. The first transmission element P11 of the planetary gear set P1 is formed by a ring gear of the planetary gear set P1. The second transmission element P12 of the planetary gear set P1 is formed by a sun gear of the planetary gear set P1. The third transmission element P13 of the planetary gear set P1 is formed by a planet carrier of the planetary gear set P1. Furthermore, the planetary gear set P1 comprises planetary gears P14, which are mounted on the third transmission element P13 which is formed as a planetary gear carrier. The first transmission element P11 of the planetary gear set is permanently coupled to the output shaft 12 in a rotationally fixed manner and is permanently connected to an input end of the output shaft 12 in a rotationally fixed manner. The second transmission element P12 of the planetary gear set P1 is directly coupled to the countershaft 13 and is directly coupled to the countershaft 13 via a toothing. The third transmission element P13 of the planetary gear set P1 is permanently coupled to the input shaft 11 in a rotationally fixed manner and is permanently connected to an output-side end of the input shaft 11 in a rotationally fixed manner. The power-split power flow therefore takes place via the third gear element P13, which is designed as a planetary gear carrier and is divided there.

The first gear wheel plane Z1 is located closest to the clutch K1, in particular also to the drive unit 22, with respect to the remaining gear wheel planes Z2, Z3, Z4. The first gear wheel plane Z1 has an idler gear 15 and a fixed gear 16. The idler gear 15 of the first gear wheel plane Z1 is arranged coaxially with the input shaft 11 and is rotatably mounted on the input shaft 11. The idler gear 15 forms a first idler gear 15 of the input shaft 11. The fixed gear 16 of the first gear wheel plane Z1 is arranged coaxially to the countershaft 13 and is permanently connected to the countershaft 13 in a rotationally fixed manner. The fixed gear 16 of the first gear wheel plane Z1 forms a first fixed gear 16 of the countershaft 13. The idler gear 15 and the fixed gear 16 form a gear wheel pair of the first gear wheel plane Z1 and are permanently meshed with each other. The first gear wheel plane Z1 is designed as a single gear wheel plane.

The third gear wheel plane Z3 is arranged starting from the clutch K1 along an axial direction 17 after the second gear wheel plane Z2. The third gear wheel plane Z3 has an idler gear 19 and a fixed gear 24. The idler gear 19 of the third gear wheel plane Z3 is arranged coaxially with the input shaft 11 and is rotatably mounted on the output shaft 12. The idler gear 19 of the third gear wheel plane Z3 forms a second idler gear 19 of the output shaft 12. The fixed gear 24 of the third gear wheel plane Z3 is arranged coaxially to the countershaft 13 and is permanently connected to the countershaft 13 in a rotationally fixed manner. The fixed gear 24 of the third gear wheel plane Z3 forms a second fixed gear 24 of the countershaft 13. The idler gear 19 of the third gear wheel plane Z3 is provided to form the second transmission gear G2. The idler gear 19 and the fixed gear 24 form a gear wheel pair of the third gear wheel plane Z3 and are permanently meshed with each other. The third gear wheel plane Z3 is designed as a single gear plane. The second fixed gear 24 of the countershaft 13 forms a second gear wheel.

The fourth gear wheel plane Z4 is arranged starting from the clutch K1 along an axial direction 17 after the third gear wheel plane Z3. The fourth gear wheel plane Z4 has an idler gear 18 and a fixed gear 25. The idler gear 18 of the fourth gear wheel plane Z4 is arranged coaxially with the input shaft 11 and is rotatably mounted on the output shaft 12. The idler gear 18 of the fourth gear wheel plane Z4 forms a first idler gear 18 of the output shaft 12. The fixed gear 25 of the fourth gear wheel plane Z4 is arranged coaxially to the countershaft 13 and is permanently connected to the countershaft 13 in a rotationally fixed manner. The fixed gear 25 of the fourth gear wheel plane Z4 forms a third fixed gear 25 of the countershaft 13. The idler gear 19 of the fourth gear wheel plane Z4 is provided to form the second transmission gear G2. The idler gear 19 and the fixed gear 24 form a gear wheel pair of the fourth gear wheel plane Z4 and are permanently meshed with each other. The fourth gear wheel plane Z4 is designed as a single gear plane. The third fixed gear 25 of the countershaft 13 forms a first gear wheel. The two gear wheels can be coupled to the output shaft 12, in particular via a claw clutch.

The idler gear 18 of the fourth gear wheel plane Z4 has a gear wheel diameter and/or a number of teeth which is/are different compared to the idler gear 19 of the third gear wheel plane Z3. Furthermore, the fixed gear 25 of the fourth gear wheel plane Z4 has a gear wheel diameter and/or a number of teeth which is/are different compared to the fixed gear 24 of the third gear wheel plane Z3.

Furthermore, the range-change transmission device 10 has a torque adjustment device 14, which is provided for reducing and/or increasing a torque transmitted, in particular via the countershaft 13. The torque adjusting device 14 is provided for changing, in particular continuously changing, a transmission ratio of the range-change transmission device 10 during a starting process and/or during a switching process. The torque adjustment device 14 is formed by an electric machine, wherein the electric machine is operated as a generator for braking action. In principle, however, another design of the torque adjustment device 14 that would appear sensible to a person skilled in the art would also be conceivable, such as a hydraulic pump, a retarder or a friction brake. The countershaft 13 is coupled to the torque adjustment device 14. The countershaft 13 is coupled or can be coupled in a rotationally fixed manner to a rotor of the torque adjustment device 14 which is not further visible. By means of the torque adjustment device 14, the countershaft 13 can be additionally accelerated and/or in particular decelerated.

The torque adjustment device 14 is arranged coaxially to the countershaft 13, which is advantageous for an overall arrangement of the range-change transmission device 10.

Furthermore, the second transmission element P12 of the planetary gear set P1 is permanently coupled in a rotationally fixed manner to the idler gear 15, which is permanently in engagement with the fixed gear 16 of the countershaft 13. The second transmission element P12 of the planetary gear set P1 is permanently coupled in a rotationally fixed manner to the first idler gear 15 of the input shaft 11, which is permanently in engagement with the first fixed gear 16 of the countershaft 13. The second transmission element P12 of the planetary gear set P1 is connected to the first idler gear 15 of the input shaft 11 via a hollow shaft surrounding the input shaft 11. The second transmission element P12, designed as a sun gear, is connected to the countershaft 13 via a spur gear stage forming the constant.

Furthermore, the range-change transmission device 10 has the first switching unit S1. The first switching unit S1 is formed by a claw switching unit. The first switching unit S1 is arranged in the axial direction 17 behind the planetary gear set P1. The first switching unit S1 is arranged behind the planetary gear set P1 in axial direction 17, viewed in torque flow direction. The first switching unit S1 is arranged on a side of the planetary gear set P1 facing away from the drive unit 22. Furthermore, the first switching unit S1 is provided to couple the countershaft 13 to the output shaft 12. The first switching unit S1 is arranged coaxially to the output shaft 12. The first switching unit S1 also has three switching positions S11, S12, S1N. The first switching unit S1 has a first switching position S11, a second switching position S12 and a neutral switching position S1N.

The first switching unit S1 is provided in the first switching position S11 to couple the first idler gear 18 of the output shaft 12 to the output shaft 12 in a rotationally fixed manner. For this purpose, the first switching unit S1 has a first coupling element 30 permanently coupled to the first idler gear 18 of the output shaft 12 in a rotationally fixed manner. The first coupling element 30 and the first idler gear 18 are permanently connected to each other via a hollow shaft. The first switching unit S1 also has a second coupling element 29, which is permanently connected to the output shaft 12 in a rotationally fixed manner. Furthermore, the first switching unit S1 has a switching element 32, which is formed by a claw switching element and is designed to be axially moveable by means of an actuator which is not further visible. In order to implement the first switching position S11, the first coupling element 30 and the second coupling element 29 are coupled to each other via the switching element 32 in a rotationally fixed manner. In the first switching position S11, the output shaft 12 is coupled to the countershaft 13 via a spur gear stage of the fourth gear wheel plane Z4 (FIG. 3).

In the second switching position S12, the first switching unit S1 is provided to couple the second idler gear 19 of the output shaft 12 to the output shaft 12 in a rotationally fixed manner. For this purpose, the first switching unit S1 has a second coupling element 28 permanently coupled to the second idler gear 19 of the output shaft 12 in a rotationally fixed manner. The second coupling element 28 and the second idler gear 19 are permanently connected to each other via a hollow shaft in a rotationally fixed manner. In order to implement the first switching position S11, the first coupling element 30 and the second coupling element 29 are coupled to each other via the switching element 32 in a rotationally fixed manner. In the second switching position S12, the output shaft 12 is coupled to the countershaft 13 via a second spur gear stage of the third gear wheel plane Z3. The second spur gear stage has a different transmission ratio when compared to that of the first gear stage (FIG. 4).

In the neutral switching position S1N, the first switching unit S1 is functionless. In the neutral switching position S1N, no coupling of the output shaft 12 to the countershaft 13 takes place. In the neutral switching position S1N of the first switching unit S1, the switching element 32 is only coupled to the second coupling element 29 (FIG. 2).

Furthermore, the range-change transmission device 10 has the second switching unit S2, which is formed by a claw switching unit and is arranged in axial direction 17 in front of the planetary gear set P1. The second switching unit S2 is arranged in axial direction 17, viewed in the torque flow direction, in front of the planetary gear set P1. The second switching unit S2 is arranged on a side of the planetary gear set P1 facing the drive unit 22. Furthermore, the second switching unit S2 is arranged coaxially to the input shaft 11. The second switching unit S2 also has at least two switching positions S21, S22, S2N. The second switching unit S2 has three switching positions S21, S22, S2N. The first switching unit S1 has a first switching position S21, a second switching position S22 and a neutral switching position S2N.

The second switching unit S2 is provided to interlock the planetary gear set P1 in the first switching position S21. In the first switching position S21, the second switching unit S2 is provided to connect the second transmission element P12 of the planetary gear set P1 and the third transmission element P13 of the planetary gear set P1 in a rotationally fixed manner. Furthermore, the second switching unit S2 is provided in the first switching position S21 to couple the input shaft 11 directly to the countershaft 13. For this purpose, the second switching unit S2 has a first coupling element 27 which is permanently coupled to the second gear element P12 of the planetary gear set P1 in a rotationally fixed manner. The first coupling element 27 is permanently coupled to the first idler gear 15 of the input shaft 11 via a hollow shaft in a rotationally fixed manner. The second switching unit S2 also has a second coupling element 26. The switching element 31 is formed by a claw switching element. The switching element 31 is designed to be axially moveable by means of an actuator, which is not further visible. In order to implement the first switching position S21 of the second switching unit S2, the first coupling element 27 and the second coupling element 26 are coupled to each other in a rotationally fixed manner via the switching element 31. In the first switching position S21 of the second switching unit S2, the input shaft 11 is directly coupled to the countershaft 13. In the second switching unit S2, the input shaft 11 is coupled in a rotationally fixed manner to the first idler gear 15 of the input shaft 11 and coupled to the countershaft 13 via the idler gear 15.

Furthermore, the range-change transmission device 10 has a braking device 20, which is provided to attach the second transmission element P12 of the planetary gear set P1 to the housing. The braking device 20 is formed by a coupling element of the second switching unit S2 that is fixed to the housing. In principle, however, other designs of the braking device 20 that seem sensible to a person skilled in the art are also conceivable. The second switching unit S2 is provided in a second switching position S22 for coupling to the braking device 20 and to couple the second transmission element P12 to the braking device 20 in a rotationally fixed manner. In order to implement the second switching position S22 of the second switching unit S22, the first coupling element 27 and the braking device 20 are coupled to each other in a rotationally fixed manner via the switching element 31. The second transmission element P12 of the planetary gear set P1 is thereby connected to the housing. The second transmission element P12, designed as a sun gear, can be stopped by means of the switching element 31 which is designed as a claw, with the input shaft 11 or as a high-speed gear with the housing.

In the neutral switching position S2N, the second switching unit S2 is functionless. In the neutral switching position S2N of the second switching unit S2, the switching element 31 is only coupled to the first coupling element 27.

A switching strategy for switching the switching units S1 and S2 can be taken from the table in FIG. 5. Four gears G1, G2, G3, G4 can be shifted. A marking in the corresponding row means that the corresponding switching unit S1 and S2 is in the switching position S11, S12, S1N, S21, S22, S2N corresponding to the column, in order to switch the gear G1, G2, G3, G4 shown in the first column. In the first gear G1, the first switching unit S1 is in the first switching position S11 and the second switching unit S2 is in the neutral switching position S2N (FIG. 3). A drive torque is transmitted in the first gear G1 from the input shaft 11 via the planetary gear set P1 partly to the countershaft 13 and from the countershaft 13 via the spur gear stage of the fourth gear wheel plane Z4 and from the planetary gear set P1 directly to the output shaft 12. Part of the power is transmitted via the third transmission element P13 and another part runs via the spur gear stage of the fourth gear wheel plane Z4 back to the output shaft 12. This results in the appropriate transmission ratios in each of the switched gears.

In the second gear G2, the first switching unit S1 is in the second switching position S12 and the second switching unit S2 is in the neutral switching position S2N (FIG. 4). In the second gear G2, a drive torque is partially transmitted from the input shaft 11 via the planetary gear set P1 to the countershaft 13 and from the countershaft 13 via the spur gear stage of the third gear wheel plane Z3 and from the planetary gear set P1 directly to the output shaft 12. Part of the power is transmitted via the third transmission element P13 of the planetary gear set P1 and another part runs via the spur gear stage of the third gear wheel plane Z3 back to the output shaft 12. This results in the appropriate transmission ratios in each of the switched gears.

In the third gear G3, the first switching unit S1 is in the neutral switching position S1N and the second switching unit S2 is in the first switching position S21. In the third gear G3, a drive torque is transmitted directly from the input shaft 11 via the planetary gear set P1 to the output shaft 12. The planetary gear set P1 is interlocked so that a drive torque is passed through the planetary gear set P1 free from a transmission ratio.

In the fourth gear G4, the first switching unit S1 is in the neutral switching position S1N and the second switching unit S2 is in the second switching position S22. In the fourth gear G4, a drive torque is transmitted directly from the input shaft 11 via the planetary gear set P1 to the output shaft 12. The second transmission element P12 of the planetary gear set P1 is fixed to the housing such that the planetary gear set P1 effects a transmission ratio. The fourth gear G4 forms an overdrive-gear.

Furthermore, a method for operating the range-change transmission device 10 is also disclosed. The method comprises a starting process. No gear is engaged for starting and both switching units S1, S2 are in the neutral switching position S1N, S2N (FIG. 2). The planetary gear set P1 is load-free, since no counter torque is applied to the second transmission element P12, which is designed as a sun gear. When the vehicle 21 is stationary and the drive unit 22 is running, the second transmission element P12, designed as a sun wheel, rotates at high speed. When the second transmission element P12, designed as a sun gear, is decelerated by means of the torque adjustment device 14 via the countershaft 13, a torque is built up and the vehicle 21 begins to move. When a gear speed is reached, the corresponding switching element 31, 32 can be engaged and the starting process is completed. When a gear speed is reached, the first switching unit S1 is brought to a first switching position S11.

Furthermore, the method comprises a process for load switching. In a first step, the torque is reduced via the countershaft 13 by the torque adjusting device 14. The switching element 32 of the first switching unit S1 now becomes load-free and can be switched to the neutral switching position S1N. Subsequently, the new target gear speed is approached. If the target gear speed is reached, the next gear wheel or the next idler gear 18, 19 can be coupled to the first switching unit S1 by means of the switching element 32. The torque via the countershaft 13 is released again by disengaging the torque adjustment device 14. This method can be used under load for up- and downshifts. For this purpose, the braking torque on the countershaft 13 must be increased or reduced in the case of speed approximation. In overrun operation, a load switching is only possible through the design of the torque adjustment device 14. However, a load switching in overrun operation would also be conceivable, for example, if the torque adjustment device 14 is designed as a hydraulic motor.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST

10 range-change transmission device
11 input shaft
12 output shaft
13 countershaft
14 torque adjustment device
15 idler gear
16 fixed gear
17 direction
18 idler gear
19 idler gear
20 braking device
21 motor vehicle
22 drive unit
23 multi-stage transmission
24 fixed gear 25 fixed gear
26 coupling element
27 coupling element
28 coupling element
29 coupling element
30 coupling element
31 switching element
32 switching element
G1 gear
G2 gear
G3 gear
G4 gear
P1 planetary gear set
P11 transmission element
P12 transmission element
P13 transmission element
P14 planetary gear
S1 switching unit
S11 switching position
S12 switching position
S1N switching position
S2 switching position
S21 switching position
S22 switching position
S2N switching position
Z1 gear wheel plane
Z2 gear wheel plane
Z3 gear wheel plane
Z4 gear wheel plane

The invention claimed is:

1. A range-change transmission device, which is a splitter transmission, the range-change transmission device comprising:
   an input shaft;
   an output shaft;
   a countershaft;
   at least one planetary gear set comprising a first, second, and third transmission element;
   a first switching unit configured to couple the countershaft to the output shaft;
   a second switching unit that is attached to one of the first, second, and third transmission elements of the planetary gear set and is configured to couple the input shaft to the countershaft; and
   a torque adjustment device,
   wherein the first transmission element of the planetary gear set is arranged coaxially to the output shaft and is coupled or can be coupled to the output shaft in such a way that the first transmission element and the output shaft rotate at the same angular speed,
   wherein the second transmission element of the planetary gear set is coupled or can be coupled to the countershaft,
   wherein the third transmission element of the planetary gear set is arranged coaxially to the input shaft and is permanently connected to the input shaft, such that the third transmission element and the input shaft always rotate at the same angular speed, and
   wherein the second transmission element of the planetary gear set is or can be coupled to the torque adjustment device.

2. The range-change transmission device of claim 1, wherein the second transmission element of the planetary gear set is permanently coupled in a rotationally fixed manner to an idler gear, which is arranged coaxially to the input shaft and rotatable relative to the input shaft and which is permanently in engagement with a fixed gear of the countershaft.

3. The range-change transmission device of claim 1, wherein the second switching unit is configured to interlock the planetary gear set.

4. The range-change transmission device of claim 1, wherein the first switching unit has a neutral switching position.

5. The range-change transmission device of claim 1, wherein the first switching unit is configured, in a first switching position, to couple a first idler gear of the output shaft to the output shaft in a rotationally fixed manner.

6. The range-change transmission device of claim 5, wherein the first switching unit is configured, in a second switching position, to couple a second idler gear of the output shaft to the output shaft in a rotationally fixed manner.

7. The range-change transmission device of claim 1, further comprising:
   a braking device configured to connect the second transmission element of the planetary gear set to a housing of the range-change transmission device.

8. The range-change transmission device of claim 7, wherein the second switching unit is provided for coupling to the braking device.

9. The range-change transmission device of claim 1, wherein the second switching unit is configured to couple the second transmission element of the planetary gear set to the input shaft in a rotationally fixed manner.

10. The range-change transmission device of claim 1, wherein the first transmission element of the planetary gear set is an internal gear of the planetary gear set.

11. The range-change transmission device of claim 1, wherein the second transmission element of the planetary gear set is a sun gear of the planetary gear set.

12. The range-change transmission device of claim 1, wherein the third transmission element of the planetary gear set is a planetary gear carrier of the planetary gear set.

* * * * *